(12) United States Patent
Rivas, Jr. et al.

(10) Patent No.: US 7,913,161 B2
(45) Date of Patent: Mar. 22, 2011

(54) COMPUTER-IMPLEMENTED METHODS AND SYSTEMS FOR ELECTRONIC DOCUMENT INHERITANCE

(75) Inventors: Luis M. Rivas, Jr., Duluth, GA (US); Roger Woehl, Novato, CA (US)

(73) Assignee: Enwisen, Inc., Novato, CA (US)

( * ) Notice: Subject to any disclaimer, the term of this patent is extended or adjusted under 35 U.S.C. 154(b) by 1213 days.

(21) Appl. No.: 11/430,811

(22) Filed: May 8, 2006

(65) Prior Publication Data

US 2007/0260971 A1    Nov. 8, 2007

(51) Int. Cl.
   *G06F 17/00*    (2006.01)
(52) U.S. Cl. ......... 715/229; 715/234; 715/239; 715/271
(58) Field of Classification Search .................. 715/229, 715/234, 239, 271
   See application file for complete search history.

(56) References Cited

U.S. PATENT DOCUMENTS

| | | | |
|---|---|---|---|
| 5,893,109 A | 4/1999 | DeRose et al. | |
| 6,574,634 B2 | 6/2003 | Woehl | |
| 6,772,165 B2 * | 8/2004 | O'Carroll | 707/101 |
| 6,848,078 B1 * | 1/2005 | Birsan et al. | 715/206 |
| 6,981,218 B1 | 12/2005 | Nagao | |
| 7,392,471 B1 * | 6/2008 | Ford et al. | 715/234 |
| 7,437,662 B1 * | 10/2008 | Yu et al. | 715/229 |
| 2002/0046224 A1 | 4/2002 | Bendik | |
| 2002/0104070 A1 | 8/2002 | Adams | |
| 2004/0044691 A1 | 3/2004 | Wajda | |
| 2004/0268254 A1 | 12/2004 | Fujiwara | |
| 2005/0108279 A1 | 5/2005 | Di Giuliani | |
| 2005/0256893 A1 * | 11/2005 | Perry | 707/101 |
| 2006/0136513 A1 | 6/2006 | Ngo | |

OTHER PUBLICATIONS

"XML Comment" Archived Dec. 24, 2005, http://www.tizag.com/xmlTutorial/xmlcomment.php.*
"*DOM* vs. *Hashtable/ArrayList*", Sun Forums, Last Post Jun. 14, 2002, http://forums.sun.com/thread.jspa?threadID=266167.*
"getElementById Method", Tellme Studio, DOM Reference, May 3, 2004, http://studio.tellme.com/dom/ref/methods/getelementbyid-p.html.*
Fussell, Mark, "Indexing XML, XML ids and a better GetElementByID method on the XmlDocument class", Feb. 12, 2004, http://blogs.msdn.com/mfussell/archive/2004/02/12/71700.aspx.*
Auld, Chris et al, Practical XML for the Web, © Glasshaus 2002, Chapter 5 http://www.webreference.com/xml/resources/books/practicalxml/chapter5/.*

* cited by examiner

*Primary Examiner* — Adam M Queler
(74) *Attorney, Agent, or Firm* — Young Law Firm, P.C.

(57) ABSTRACT

A computer-implemented method of managing electronic documents includes steps of providing a first electronic document, the first document including a plurality of first document content elements; providing a second electronic document, the second document including a plurality of second document content elements; defining a parent-child relation between the first document and the second document to form a hierarchy of electronic documents that includes the first and second electronic documents; defining an override relation to bind a selected first document content element to a selected second document content element, the override relation specifying an override type that determines whether the selected second document content element should be replaced by, appended to the selected first document content element or removed, and enforcing the at least one override relation binding the selected first document content element to the selected second document content element.

20 Claims, 7 Drawing Sheets

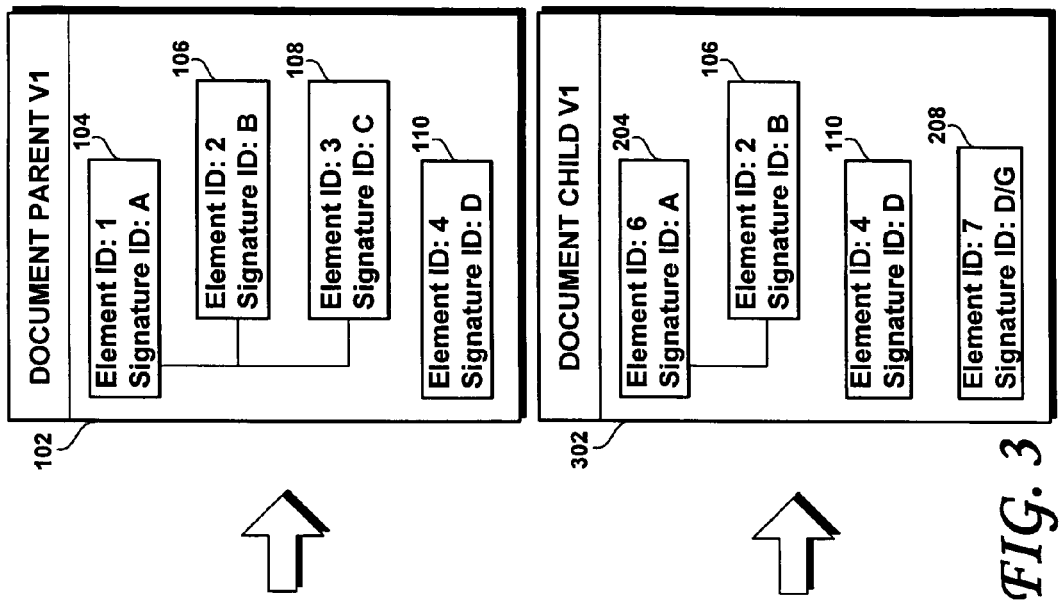
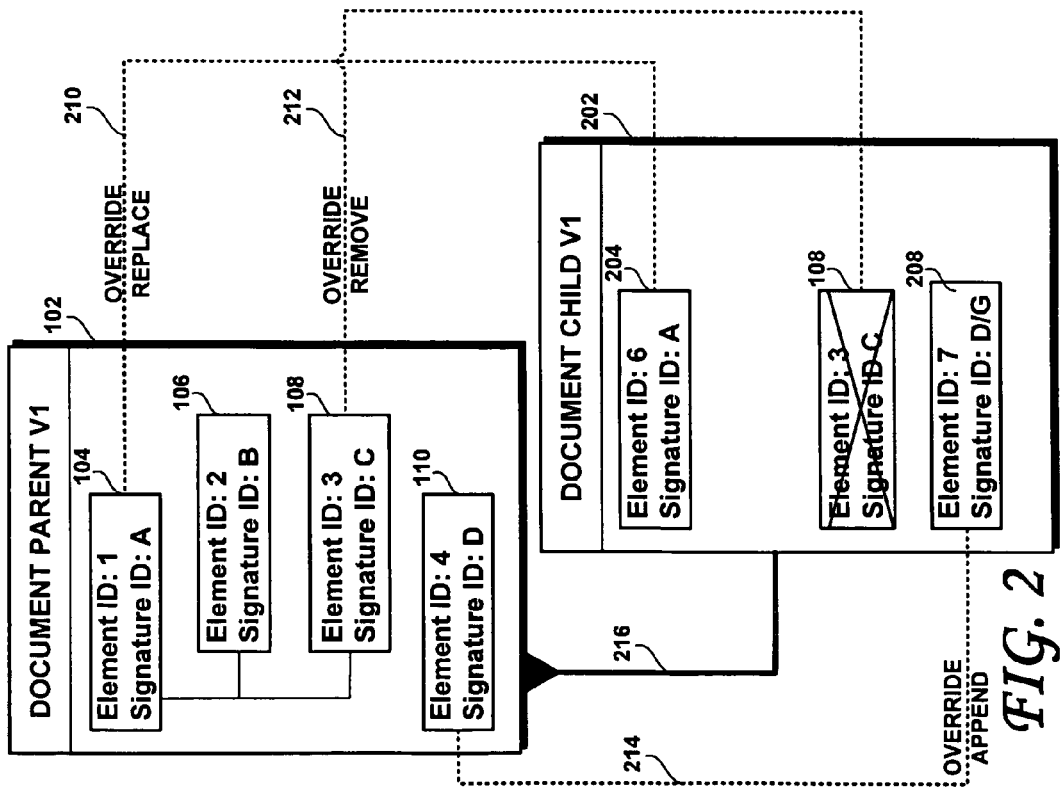

COMPUTER-IMPLEMENTED METHODS AND SYSTEMS FOR ELECTRONIC DOCUMENT INHERITANCE

BACKGROUND OF THE INVENTION

1. Field of the Invention

The present inventions generally pertain to the field of document management. More particularly, the present inventions pertain to computer-implemented methods and systems for document management in which multiple authors contribute to document authoring of sets of related documents. Such computer-implemented document management methods and systems facilitate rapid delivery and effective management of sets of structured documents.

2. Description of the Prior Art and Related Information

The need for effective document management arises in many fields. For example, corporate Human Resources (HR) is one such field. A corporation may offer a number of benefits and it is one of Human Resources' jobs to communicate accurate and current details of those benefits to the employees of the corporation. Preferably, the benefit information presented to the employees should have a common structure that allows them to efficiently find, compare and select their benefit information. Moreover, such benefit information should be delivered in a cost effective manner, and in a manner that insures legal accuracy and compliance with government regulations.

The content of such documents may originate from multiple contributors, both from within the corporation and from sources outside the corporation. Continuing with the corporate benefits example developed herein, a first contributor to a corporate benefits package document may include an insurance agency that provides the benefit policy, a second contributor may include a brokerage agency that sold the policy, and a third contributor may be the corporation's human resource administrators. Other sources of content in such a document may stem from the need to comply with particular state laws and regulations or to accommodate collective bargaining agreements, for example.

A medical coverage benefit is a specific example of a Benefits Plan. Such a Benefits Plan may include multiple documents that are organized across multiple tiers. For example, a document or documents in the top tier may set out the essential benefits of the Plan, whereas documents in the second lower tier may include details of the Benefits Plan. For example, documents in the second tier may provide particular types of benefit plans, such as the HMO or PPO available to the employees. A third lower tier may, for example, include documents setting out details of a benefit plan provided by an insurance agency. Continuing, a fourth lower tier may include one or more documents that detail the requirements specific to a company or organization, and documents associated with a fifth lower tier may include details particular to a group within the company It would be beneficial for the corporation to have the ability and tools to allow it to manage such sets of related documents using a common framework in which changes made to the information in documents associated with a higher tier are reflected in corresponding information in documents associated with a comparatively lower tier. For example, it would be advantageous if a change in a topic name made within a document in the first tier would be reflected in documents in the fifth tier.

SUMMARY OF THE INVENTION

According to an embodiment thereof, the present invention is a computer-implemented method of managing electronic documents that includes steps of providing a first electronic document, the first document including a plurality of first document content elements; providing a second electronic document, the second document including a plurality of second document content elements; defining a parent-child relation between the first document and the second document to form a hierarchy of electronic documents that may include the first and second electronic documents; defining an override relation to bind a selected first document content element to a selected second document content element, and enforcing the override relation binding the selected first document content element to the selected second document content element.

According to further embodiments, the defining step may be carried out with the override relation specifying an override type that determines whether the selected second document content element should be removed, replaced by or appended to the selected first document content element. The method may also include a step of revising the first electronic document, the revising of the first electronic document resulting in a corresponding revision to the second electronic document. Steps of determining which of the first document content elements are not present in the second document content elements, and adding any first document content element that may be not present in the second electronic to the second electronic document may also be carried out. One or more of the first and second content elements may include or may point to text, an image, HTML content, video content, a Uniform Resource Locator (URL) and/or computer code, to name but a few possible examples. Each content element of the plurality of first and second content elements may be associated with a unique content element ID and a signature ID. The selected second document content element, after the enforcing step is carried out, may share the same signature ID as the selected first document content element to which it is bound by the defined override relation. The method may further include the step of replacing the selected second document content element with a dummy element that is not rendered when the defining step is carried out with the override type that specifies that the selected second document content element should be removed. The method may further include a step of building a first hash table associated with the first electronic document and a second hash table associated with the second electronic document. The first hash table may include an entry for each of the plurality of first document content elements and each entry may be keyed to the signature ID of its respective first document content element. Likewise, the second hash table may include an entry for each of the plurality of second document content elements and each entry may be keyed to the signature ID of its respective second document content element. The first hash table may include an entry for each of the plurality of first document content elements and an entry for each content element of all hierarchically-higher electronic documents that are bound to the first electronic document, if any. The second hash table may include an entry for each of the plurality of second document content elements and all entries in the first hash table. The signature ID of the overridden selected second document content element may be the same as the signature ID of the selected first document content element bound thereto by the defined override relation. The second electronic document may be remote from the first electronic document and the defining and enforcing steps may be carried out across a computer network.

According to a further embodiment thereof, the present invention is also a machine-readable medium having data stored thereon representing sequences of instructions which, when executed by a computing device, causes the computing device to manage electronic documents by performing the steps of providing a first electronic document, the first document including a plurality of first document content elements; providing a second electronic document, the second document including a plurality of second document content elements; defining a parent-child relation between the first document and the second document to form a hierarchy of electronic documents that may include the first and second electronic documents; defining an override relation to bind a selected first document content element to a selected second document content element, and enforcing the override relation binding the selected first document content element to the selected second document content element.

According to yet another embodiment, the present invention is a computer system for managing electronic documents, the computer system comprising at least one processor; at least one data storage device coupled to the at least one processor; a plurality of processes spawned by said at least one processor, the processes including processing logic for: providing a first electronic document, the first document including a plurality of first document content elements; providing a second electronic document, the second document including a plurality of second document content elements; defining a parent-child relation between the first document and the second document to form a hierarchy of electronic documents that may include the first and second electronic documents; defining an override relation to bind a selected first document content element to a selected second document content element, and enforcing the override relation binding the selected first document content element to the selected second document content element.

Still another embodiment of the present invention is a computer-implemented method of managing electronic documents, comprising the steps of providing a first hash map that defines a first electronic document, the first hash map including an entry for each of a plurality of first document content elements of the first electronic document, each of the plurality of first content elements being associated with a signature ID and a unique content element ID; providing a second hash map that defines a second electronic document that may be bound to the first electronic document by a parent-child relation, the second hash map including an entry for each of a plurality of second document content elements of the second electronic document and all entries of the first hash map, each of the second document content elements being associated with a signature ID, each entry in the first and second hash maps being keyed to the signature ID of the corresponding first or second document content element; defining an override relation to bind a selected first document content element to a selected second document content element, and generating the second electronic document by processing the entries in the second hash map and enforcing the defined override relation.

According to still further embodiments, the defining step may be carried out with the override relation specifying an override type that determines whether the selected second document content element should be removed, replaced by or appended to the selected first document content element. The method may also include the step of revising the first electronic document, the revising of the first electronic document resulting in corresponding revisions of the first hash map, the second hash map and the second electronic document. The method may also include steps of determining which of the first document content elements are not present in the second document content elements, and adding an entry for any first document content element that is not present in the second electronic to the second hash map. The first document content elements and/or the second document content elements may include or points to text, an image, HTML content, video content, a Uniform Resource Locator (URL) and/or computer code, for example. Each content element of the plurality of first and second document content elements may be associated with a unique content element ID and a signature ID. The selected second document content element, after the enforcing step may be carried out, may share the same signature ID as the selected first document content element to which it is bound by the defined override relation. The method may further include the step of replacing the selected second document content element with a dummy element that is not rendered when the defining step is carried out with the override type that specifies that the selected second document content element should be removed. The signature ID of the overridden selected second document content element may be the same as the signature ID of the selected first document content element bound thereto by the defined override relation. The second electronic document may be remote from the first electronic document and the defining, enforcing and generating steps may be carried out across a computer network.

BRIEF DESCRIPTION OF THE DRAWINGS

FIG. 2 is a representation of a parent and a child electronic document participating in an inheritance relationship and showing the manner in which logical override relations may be established between content elements of two electronic documents, according to an embodiment of the present invention.

FIG. 3 is a representation of a parent and a child electronic document and shows the content elements in the child document that were inherited from the parent document by virtue of the established logical override relations, according to an embodiment of the present invention.

DETAILED DESCRIPTION

Embodiments of the present invention include computer-implemented methods of document management that allow a new electronic document (which may be printed out to form paper documents) to be created by inheriting all elements of a parent electronic document. In this manner, multiple layers or generations of documents can participate in a pre-established inheritance relationship. A change to a parent electronic document may then be reflected in all related generations of electronic documents. Child documents allow modification of the parent by addition of new elements which can be specified to: overwrite an element of the parent, to delete an element of the parent, or to add a new element.

The inheritance, linking and configurable element methods of embodiments of the present invention together cooperate to benefit document management by allowing parent documents to be designated as templates, which then serve as a framework for rapidly creating new documents. Multiple generations of inheritance allow multiple layered templates enabling content elements common to many documents to be managed at a higher level with increasing specific templates at lower levels. The templates may be used at any level of the hierarchy of electronic documents to generate the documents (whether in electronic or paper form) that are ultimately relied on by users.

Figure 1:
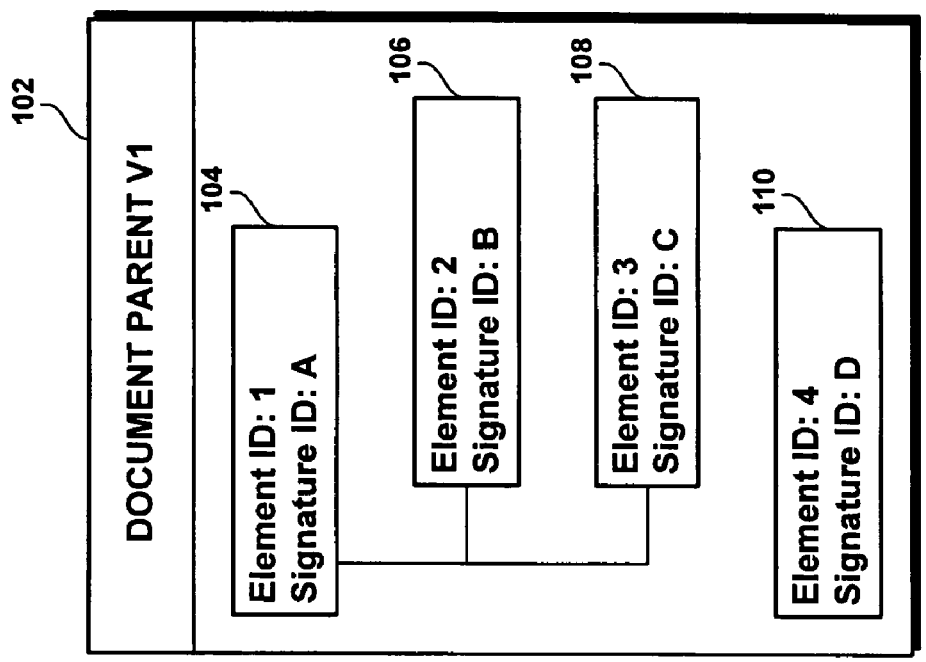
FIG. 1 is a represent of an electronic document that includes a plurality of content elements, according to an embodiment of the present invention.

FIG. 1 shows a document 102 that includes a plurality content elements 104, 106, 108 and 110. According to embodiments of the present invention, a content element may include and/or point to textual content, HTML-formatted content, image content and/or video content, for example. A content element may also include source code, object or executable code such as, for example, a JAVA applet that is embedded in a document. Content elements 106 and 108 are shown as having a dependency relation to content element 104, such as is common for a row in a display table. Content element 104 may be said, therefore, to be the parent content element of children content elements 106 and 108. According to embodiments of the present invention, each content element of each document in a hierarchy of inter-related documents may include an Element ID and a Signature ID. The Element ID uniquely identifies the content element both within a document and across documents. The Signature ID of a content element is an identifier that is kept across versions of a document and operates to show inheritance relationships between two or more content elements, as detailed below. As shown in the exemplary representation of FIG. 1, content element 104 is identified by element ID 1 and the signature ID A. Content element 104 has two children; namely content element 106 identified by element ID 2 and signature ID B and content element 108, which is uniquely identified by element ID 3 and signature ID C. Document 102 also includes content element 110, which has element ID 4 and signature ID D. It is to be understood that the element ID and the signature ID fields may be configured to be sufficiently wide so as to accommodate unique IDs, and are not limited to the 1, 2, 3 . . . and A, B, C . . . identifiers used herein for exemplary purposes.

FIG. 2 is a representation of a parent and a child document that are organized in a hierarchy, in which an inheritance relationship is defined between a parent electronic document 102 and a child electronic document 202. FIG. 2 not only shows a logical relationship between the parent document 102 and the child document 202, but also illustrates inheritance relationships between constituent content elements thereof, according to embodiments of the present invention. The logical relationship between the parent document 102 and the child document 202 is represented by parent-child relation 216 extending between the parent document 102 and the child document 202. According to an embodiment of the present invention, a child document may include all or selected elements of its parent document, as modified by logical override relations defined between all or selected constituent content elements thereof, as detailed below. A child document may also include its own native content elements; that is, one or more content elements that have no counterparts in the parent document. Such content elements in the child document 202 having no counterpart in the parent document may have been inserted in the child document as a result of an override append operation, as also detailed hereunder. As shown in FIG. 2, the child document 202 includes the content elements of its parent document 102 (in addition to any native content elements the child document 202 may have), as modified by any existing logical override relations between constituent elements of the child document 202 and of the parent document 102. The parent document 102 in FIG. 2 is identical to that shown in FIG. 1. In the illustrative case of documents 102 and 202, the child document 202 would have included content element 104 (element ID 1 and signature ID A), but for the presence of logical relation 210, which is an "override replace" relation. In this example, the override replace relation 210 specifies that content element 104 (element ID 1 and signature ID A) is to be overridden and replaced with content element 204 in the child electronic document 202. According to embodiments of the present invention, content elements that are overridden (in the exemplary case of FIG. 2, content element 104 has been overridden by content element 204) have their own element ID, but assume the signature ID of the parent content element to which the overridden content element is bound. Therefore, content element 204 has its own unique element ID 6, but assumes the signature ID A of the content element 104. Therefore, both content elements 104 and 204 share the same signature ID A. Note that the override relation between content elements 104 and 202 is of the "replace" type, meaning that the hierarchically higher content element (104 in this case) is overridden and replaced by a hierarchically lower identified content element (204 in this case). Other types of overrides include "remove" and "append", as disclosed below.

Content element 106 (element ID 2, signature ID B) of the parent document 102 is not bound by a relation to any content element of the child document 202. Therefore, content element 106 is carried over and will be represented as one of the constituent content elements of the child document 302 (FIG. 3). Content element 108 (element ID 3, signature ID C) of the parent document 102 is bound by an override relation of the "remove" type 212 to the child document 202. In accordance therewith, the child document 202, when the override relations are enforced and the child document 202 rendered, will not include a copy of the parent document's content element 108, as suggested by the X'd out content element 108. According to an embodiment of the present invention, an override remove relation may be enforced in a manner similar to an override replace relation, in that the content element to be overridden and removed may be replaced by a dummy content element (that acts as a place holder), the dummy content element including its own element ID and the signature ID of the content element in the parent document to which it is coupled by the override replace relation (in this case, content element 104 in the parent document 102). The dummy content element that overrides and replaces a content element, however, may have no visible presence in the rendered document.

As shown by the "override append" relation 214, the parent document's content element 110 (element ID 4, signature ID D) is also to be present in the child document 202, with the child document's native content element 208 (element ID 7, signature ID G) appended thereto. As shown in FIG. 3, the signature ID of an appended content element such as content element 208 may include a reference to the signature ID of the content element to which it was appended. In this case, this reference is illustrated by content element 208 having a signature ID of D/G, D being the signature ID of content element 110 having element ID 4 and signature ID D. The reference to other signature IDs may take the form of, for example, a linked list.

Advantageously, the parent-child relation 216 may be removed or broken after the override relations have been enforced between the parent electronic document and the child electronic document, for example. The removing or breaking of the parent child relation 216 effectively cuts off the child electronic document from any further revisions of the parent electronic document, thereby creating an independent document that is thereafter unaffected by any inheritance previously established between the parent and child electronic documents.

As shown in FIG. 3, the parent document 102 may remain unchanged by the logical relations between itself and its child document 302, as changes to documents may flow from hierarchically-higher documents (such as parent document 102) to hierarchically-lower documents bound thereto by parent-child relations. The child document 302 shown in FIG. 3 represents the state of the child document 202 and of its constituent content elements, after the logical relations established in FIG. 2 have been enforced and implemented and the child document generated and rendered. Therefore, child document 302 is shown to include content element 204 (element ID 6, signature ID A), which replaced the content element 104 (element ID 1, signature ID A) via the override replace relation 210, shown in FIG. 2. In the case the parent document is contract, replacing one content element with another content element may be required, for example, when replacing one Choice of Law clause designating the laws of one state as governing interpretation of the contract with another Choice of Law clause designating the laws of another state as governing interpretation of the contract. Alternatively, parent document 102 may be a template of a document and may have 50 children, all of which may be at the same hierarchical level. This would enable a single document to be customized according to the laws and regulations of every state in the Union, by judiciously setting up and enforcing parent-child relations between the parent template and each of its 50 children documents, as well as override relations between content elements of the parent and corresponding content elements of each child document. Continuing now with FIG. 3, content element 106 (element ID 2, signature B) is a child content element of content element 204, in the same manner that content element 106 (element ID 2, signature ID B) is a child content element of content element 104 (element ID 1, signature ID A) in the parent document 102. As a child document, according to an embodiment of the present invention, may include all of the content elements of its parent document (unless modified by an override relation, for example), child document 302 is shown to include content element 110 (element ID 4, signature ID D), which is also a constituent content element of the parent document 102. Appended to this content element by virtue of the append relation 214 is content element 208 (element ID 7, signature ID D/G). Content element 108 is not represented in the child document 302 (having been replaced by a dummy content element that is not rendered), due to the presence of the override remove relation 212 between the parent document 102 and the child document 202.

Figure 4:
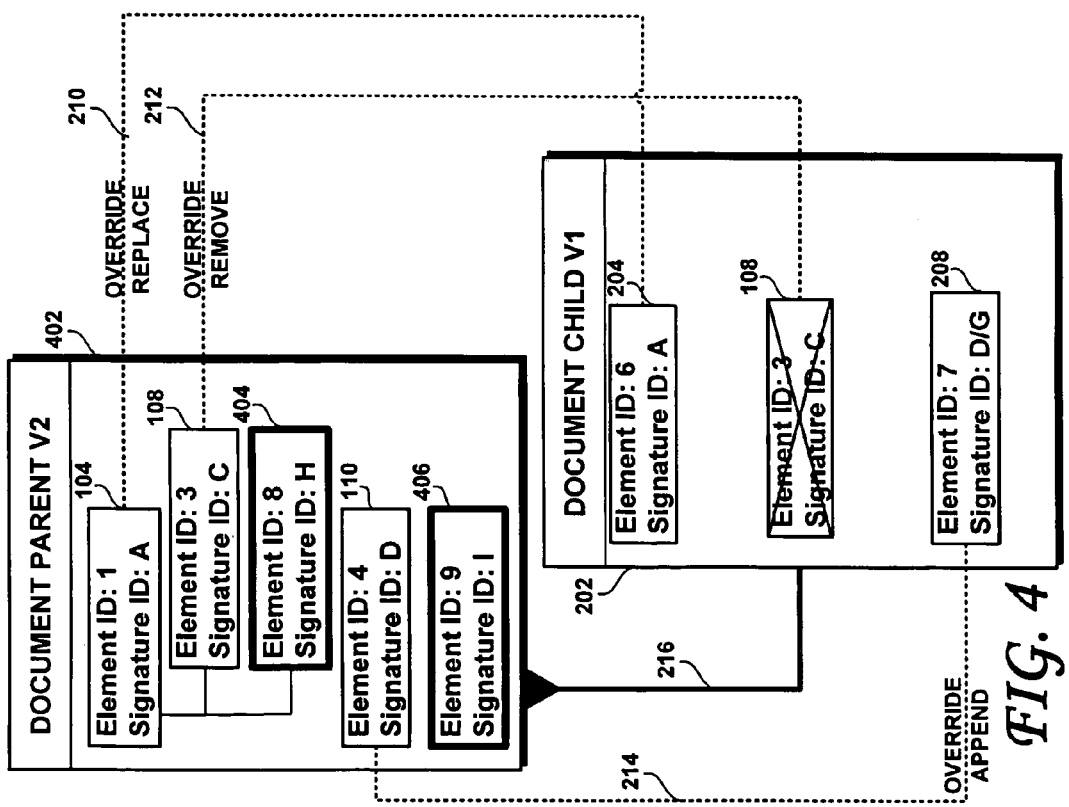
FIG. 4 is a representation of a revised or updated version of a parent electronic document and a child document and shows the manner in which the pre-established logical override relations operate to enable the child electronic document to inherit the revisions or updates made to the parent electronic document, according to an embodiment of the present invention.

FIG. 4 shows a parent document 402 and the child document 202 of FIG. 2. Parent document 402 is a revised or updated version (identified by the "V2", caption in FIGS. 4 and 5) of the parent document 102 of FIG. 1-3, which now includes content element 404 (element ID 8, signature ID H) and content element 406 (element ID 9, signature ID I), both of which are shown in FIG. 4 outlined in bold for ease of reference. Parent document 402 was also revised or updated (the two terms being used interchangeably herein) to no longer include content element 106 (element ID 2, signature ID B) that was previously present in version 1 (V1) documents shown in FIGS. 2 and 3. Such changes to the parent document (or template) may have occurred due to a revision, a new draft including changes by the same or a different author or to generate a different version of the document aimed at a different target audience or to satisfy changed laws and/or regulations, for example. For whatever reason, the parent document 402 has changed from its previous state shown at 102 in FIGS. 1-3, and it is desired that these revisions or updates also be reflected in any documents that may be bound to this parent document by a parent child relation, preferably without further or extensive human interaction. In other words, it is desired that any child documents bound thereto by a parent-child relation (such as child document 202) inherit the revisions made to the parent document 402, subject to the pre-established logical override relations between the constituent content elements in the two electronic documents 402, 202.

Figure 5:
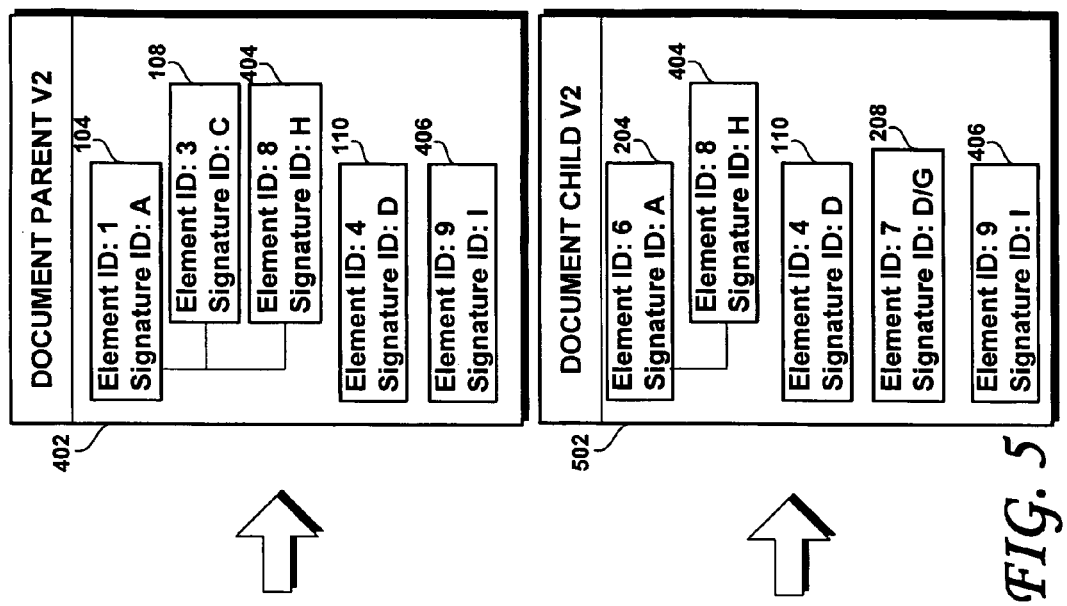
FIG. 5 is a representation of the revised or updated version of the parent electronic document and the child electronic document of FIG. 4, showing the content elements in the child electronic document that were inherited from the revised or updated parent electronic document by virtue of the established logical override relations, according to an embodiment of the present invention.

As shown in FIG. 5, after the inheritance relations are enforced, content element 106 (element ID 2, signature A) does not appear in the child document 502, as this removal of content element 106 (see parent document 102 in FIG. 2) was one of the revisions or updates to the parent document 402. Likewise, the parent document 402 was revised or updated to include new content element 404 (element ID 8, signature ID H) that depends upon content element 104 (element ID 1, signature A) and revised or updated to include new content element 406 (element ID 9, signature ID I). Reference numeral 502 shows the state of the child document 202, after the inheritance and pre-established logical override relations have been enforced and the resulting electronic document generated and rendered. As shown, child document 502 includes content element 204 (element ID 6, signature ID A), as it was bound to content element 104 (element ID 1, signature ID A) by the override replace relation 210 that specifies that content element 104 is to be overridden and replaced with content element 204, and that content element 204 shares content 104's signature ID A. The two newly added content elements 404, 406 are also added to the child document 502. Specifically, newly added content element 404 is a child of content element 104 in the parent document 402 and so is added to the child document 502 as a child to content element 204. Content element 406 is not a child of any other content element in parent document 402, and so is added to child document in the same manner. Content element 108 (element ID 3, signature ID C) is also not represented in the child document 502, because of the presence of the override remove logical relation 212. But for the presence of the override remove logical relation 212, the child document 202 would have inherited content element 108, which would have been represented in child document 502. Content element 110 (element ID 4, signature ID D) is present in the child document 502, and content element 7 (element ID 4, signature ID D/G) is appended thereto, because of the append logical relation 214. Lastly, child document 202 inherited newly added content element 406 (ID 9). Therefore, content element 406 (ID 9) is shown in child document 502.

The documents shown in FIGS. 2-5 define and form a hierarchy of electronic documents. Although the hierarchy of documents shown in FIGS. 2-5 only include two documents, it is to be understood that hierarchies of documents may be defined having a great many hierarchical levels, with each level containing an arbitrary number of documents (that is, several documents may occupy a same hierarchical level). Indeed, parent-child relations may be defined for a great many documents, and each or selected ones of the documents at any level may have one of more child documents, as defined by the parent child relations defined and established between them.

Figure 7:
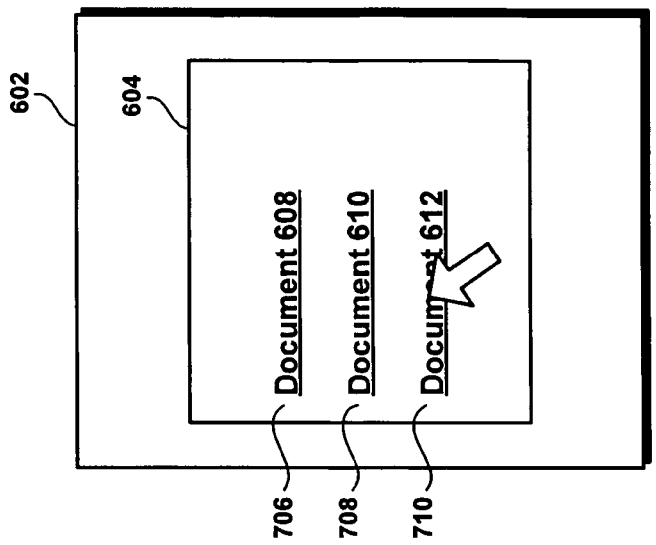
FIG. 7 is a representation of the linking element of FIG. 6, resolved for viewing to link to each child electronic document of the linked parent, according to an embodiment of the present invention.
Figure 6:
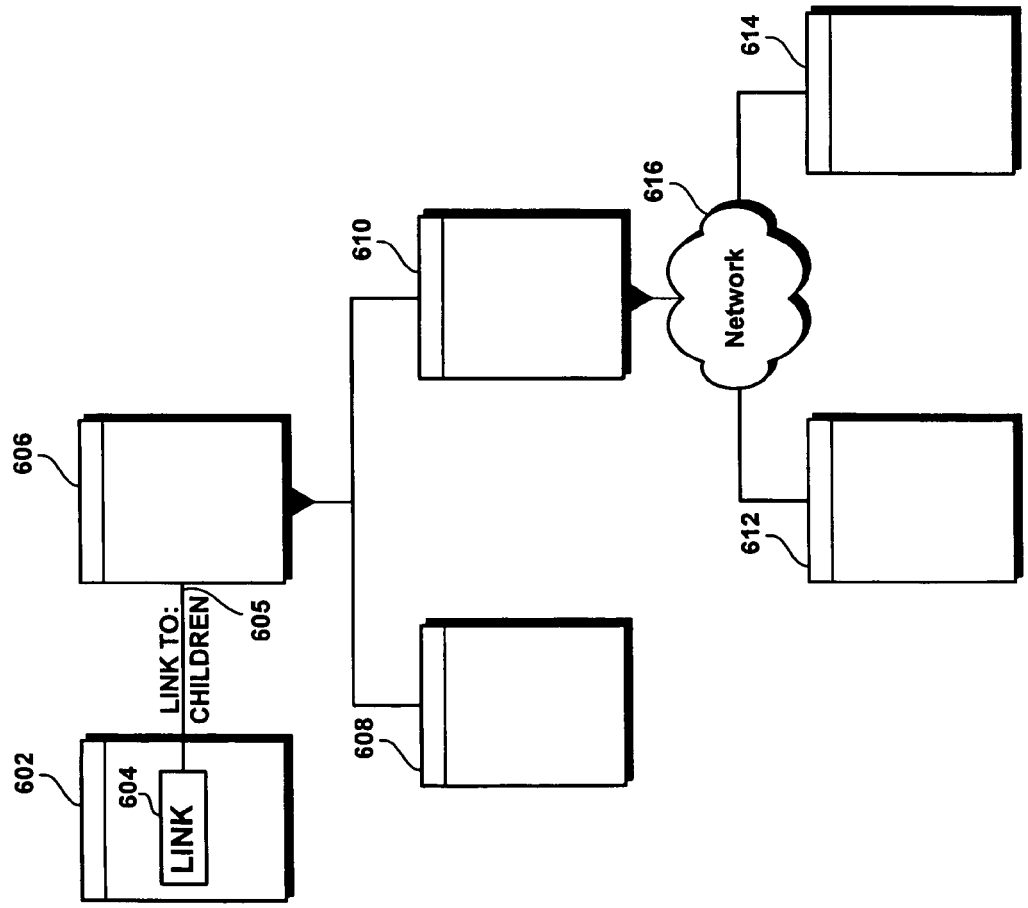
FIG. 6 is a representation of an element of an electronic document that links to another electronic document having a plurality of generations of child electronic documents, according to a further embodiment of the present invention.

FIG. 6 is a representation of an element of an electronic document that links to another electronic document having a plurality of generations of child electronic documents, according to a further embodiment of the present invention. As may be appreciated, the documents of FIG. 6 collectively form a hierarchy of documents bound to one another by parent-child relations. Selected ones of the content elements of the documents in the hierarchy of FIG. 6 may be bound to one another through one or more relations, such as the override replace, override remove and override append relations shown in FIGS. 2 and 4. The linking element 604 of the document 602 is bound to the document 606 by a relation 605 of the "link to: child/children" type. The document 606, in the illustrative example of FIG. 6, has two children documents 608, 610, bound to it by a relation of the "parent-child" type. In turn, document 610 has two children documents 612, 614, also bound to it by a relation of the "parent-child" type. Note that all or selected content elements of each of these children 612, 614, 610, 608 may be bound to their respective parents by other logical relations, such as the logical relations shown in FIGS. 2-5 such as, for example, override remove, override replace and/or override append, to name but a few possible relations that may bind one content element of one document to one or more content elements of one or more other documents. The link to: children relation 605 may, when resolved on the document 602, enable a user to click or otherwise select the or a selected done of the links on the document 602 to view the document or documents pointed to by the link. Indeed, FIG. 7 is a representation of the linking element of FIG. 6, resolved for viewing to link to selected child electronic documents of the bound parent electronic document, according to an embodiment of the present invention. The link 604 is shown in FIG. 7 as being rendered to a display device for viewing. For example, the link 604 may include HTML HREF tags and may be displayed for the user as one or more selectable hyperlinks which, if clicked on or otherwise selected by the user, causes the display of the document or documents pointed to by the link. As shown in FIG. 7, the link 604 has been resolved into three separate hyperlinks 706, 708 and 710 that point to child documents 608, 610 and 612, respectively. Note that each generation or tier of electronic documents may be managed by a different departmental, organizational or corporate entities and may be accessed across geographical, corporate, organizational or network boundaries.

In this manner, embodiments of the present invention enable the maintenance of referential links between documents so that a link from one document to another can be specified to relate to all children documents in multiple generations. When accessing a document with a link to a parent as shown in FIGS. 6 and 7, a viewer may be presented with links to all children instances of the parent available at the time of viewing. This allows referential links to be defined once to a parent level, without the need to redefine separate links for each child, thereby greatly reducing the effort of managing links between related content.

As noted above, according to embodiments of the present invention, each content element in a document may include a content element ID. The content element ID assigned to or associated with a content element is unique to that content element. A same content element ID may be represented several times across a document hierarchy, as the same content element may appear in more than one document (such as, for example, content element 110 (element ID 4, signature ID D) that appears in both documents 402, 302). When an element is overridden (whether by an override replace, an override remove or an override remove) in a child document, the overridden content element in the child document is, according to embodiments of the present invention, given the same signature ID as that of the parent content element to which it is bound by the override relation.

Physically, child documents that inherit from another document may include, in addition to any content elements that are native to the child element, the overridden, removed and/or added content elements. Logically, each electronic document may include or refer to a hash table (a table of key-value pairs) that may be constructed as and when the document is generated and rendered. This hash table may be constructed by adding the content elements of each document that participates in the inheritance to the hash table using its respective signature ID as the key or index to the hash table. The root parent (i.e., the top most document that is not a child of any other document) of the hierarchy of documents may be processed first, and then the next hierarchically lower parent documents may be processed from the top to the bottom of the hierarchy until all linked child documents have been reached and the inheritance and predetermined relations enforced. Overridden elements in a child document replace parent elements in the virtual hash table since they have the same signature ID as does the parent content element. The content element hierarchy of a document may then be build using the hash table.

A new version of parent document may be used to construct a child document, as illustrated relative to FIGS. 4 and 5. Content elements may be changed, removed and/or added to the parent document. The revised or updated parent document may be used to build the hash table of a child document to ensure that the child document inherits the content elements that were changed, removed and/or added to the parent electronic document.

Figure 8:
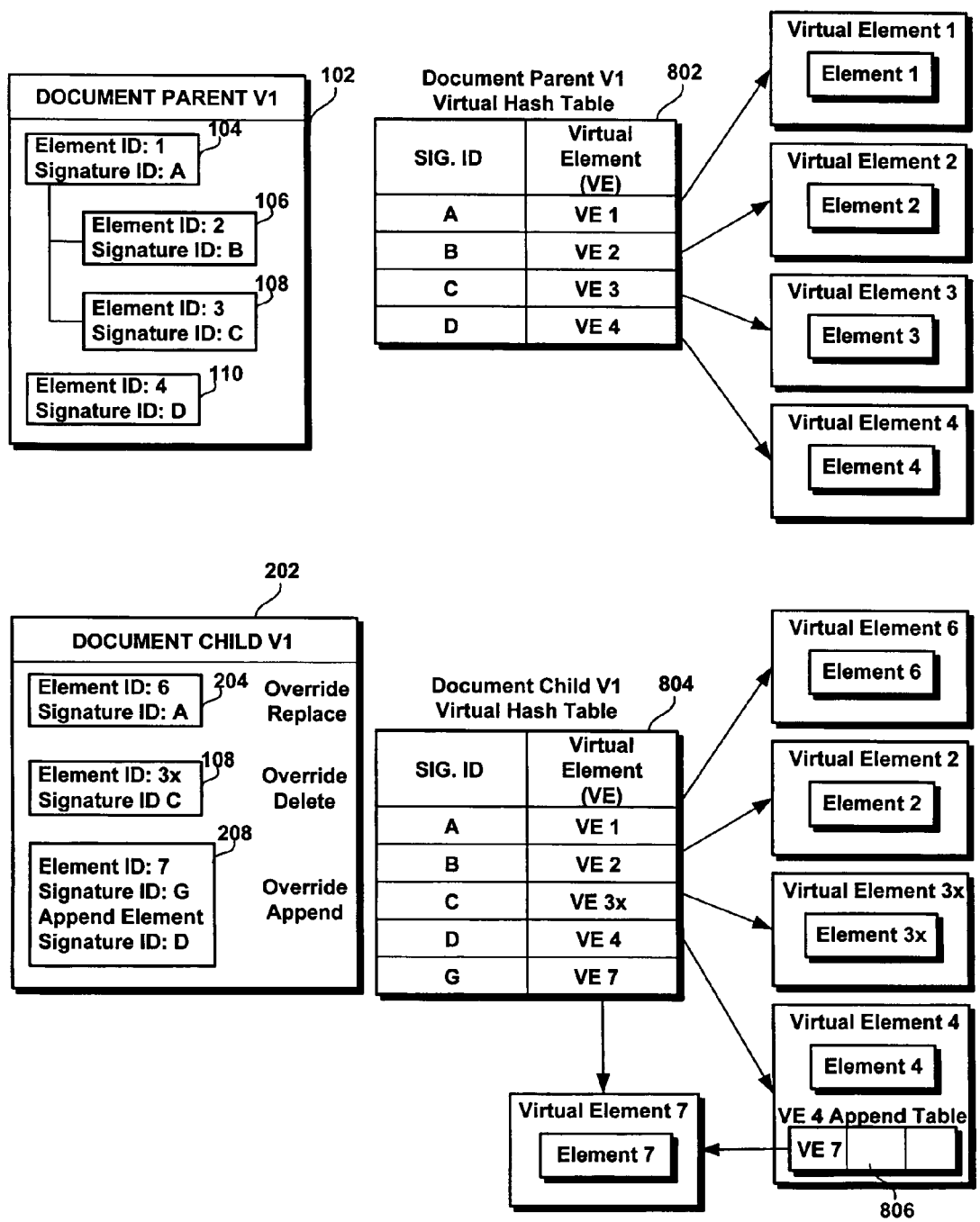
FIG. 8 is a representation of hash tables that may be constructed as and when the documents of FIG. 3 are generated and rendered, according to an embodiment of the present invention.

FIG. 8 is a representation of hash tables that may be constructed as and when the documents of FIG. 3 are generated and/or rendered, according to an embodiment of the present invention. As shown therein, the hash table 802 for document 102 may include a column for the signature ID and a column for a virtual element, a virtual container or construct that includes or refers to the content elements of the document. Each row of the hash table 802 may correspond to a content element. As shown, the hash table 802 used to generate and/or render the document 102 may include rows for contents elements 104, 106, 108 and 110 and values for their respective signature IDs and an identification of the virtual element, each of which may include, refer or point to an identification of the element ID of the content element. The hash table 804 may be used when generating and/or rendering the child document 202, which document is a child of parent document 102 referred to above. As shown in FIG. 8, the hash table 804 of the child document 202 may be constructed in a similar manner as is hash table 802 of the parent document 102—that is, the hash table 804 may include a first column for the signature ID of each content element and a second column for storing, pointing to or referring an identification of the virtual elements corresponding to each content element of the child document 202. As shown, each virtual element in the virtual element column of the hash table 804 includes, refers to or points to a virtual element that includes the element ID of its corresponding content element. Note that the content element 108 has been assigned element ID 3x, which is another way of denoting that content element 108 has been replaced (in accordance with the override delete relation associated therewith) by a dummy element that is not rendered in the document. The corresponding virtual element for this content element, therefore, may also be denoted by the element ID 3x. Interestingly, this protocol allows a content element to be appended to a dummy content element that is itself not rendered in the document. As also shown in hash table 804, the content element 208 may refer to element ID 7, signature ID G, but also to the signature ID of the content element to which the content element having the signature ID G is to be appended. Therefore, content element 208 may include a reference to signature ID D. This may be reflected in the hash table, as shown in FIG. 8. As shown therein, virtual element 4 may include not only an identification of the element ID 4, but may also include an append table 806 that may be configured to include an entry or record referring to VE7, the virtual element containing the element ID 7; namely, the element ID of the content element to be appended to content element 110. Content element 208 also includes its own entry in the hash table 804, in the same manner as any of the other content elements used to construct the child document 202. Note that virtual element 7 is referred or pointed to by the entry in virtual element 4's append table 806, as discussed immediately above.

Figure 9:
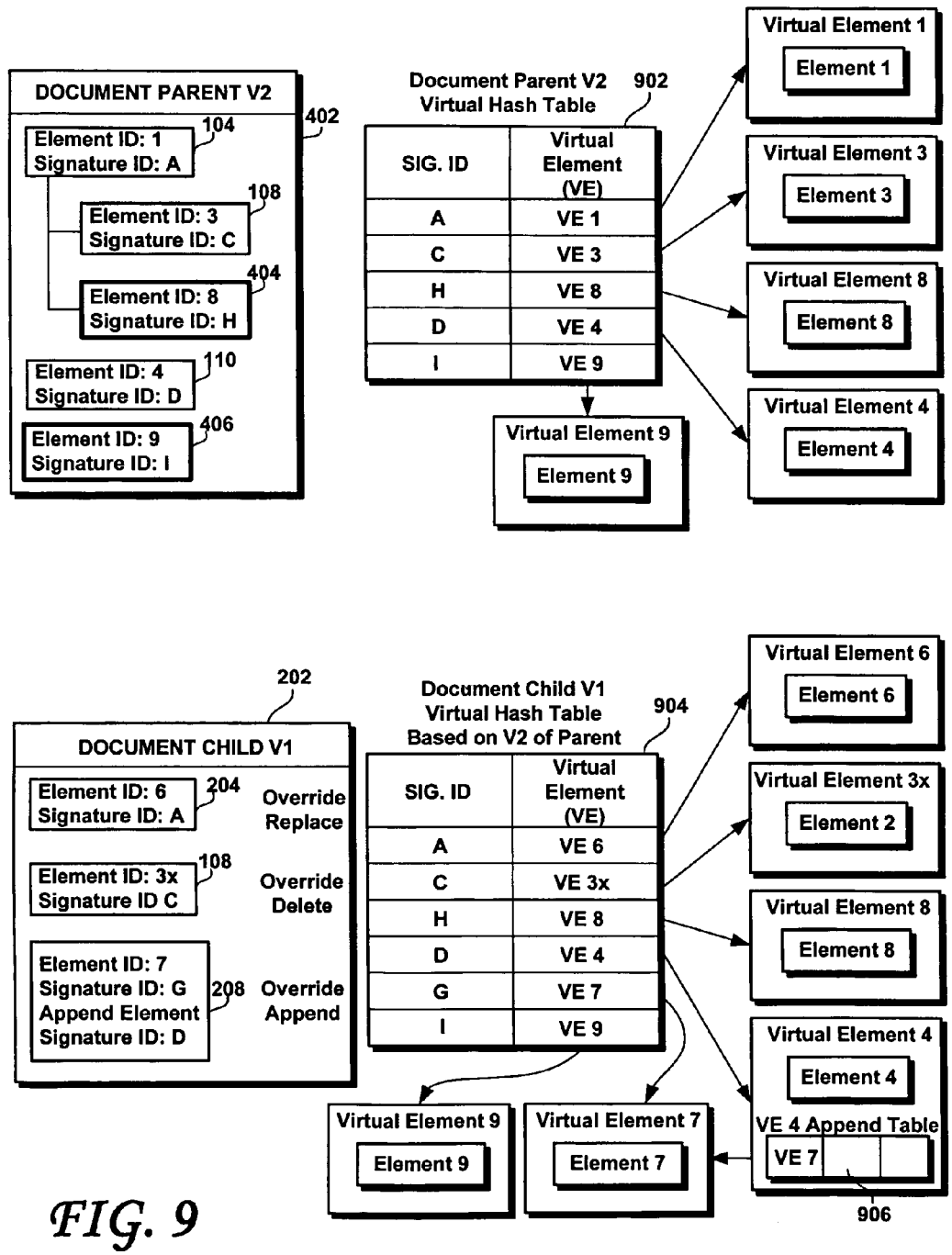
FIG. 9 is a representation of hash tables that may be constructed as and when the documents of FIG. 5 are generated and rendered, according to an embodiment of the present invention.

FIG. 9 is a representation of hash tables that may be constructed as and when the documents of FIG. 5 are generated and rendered, according to an embodiment of the present invention. The hash tables 902 and 904 may be configured similarly to hash tables 802 and 804—that is, each may include a column for the content elements' signature ID and a column for the virtual elements of the documents 402 and 202, respectively. As shown in FIG. 9, virtual element 4, which includes, refers or points to element ID 4, may also include an append table 906. The append table 906 may include an entry or record for virtual element 7, which refers to or points to the content element having element ID 7, which element is to be appended to content element 110, element ID 4. The hash table 904 of the child document 202 also includes an entry for virtual element 9, the corresponding content element of which (the content element having element ID 9 and signature ID I) was inherited from parent document 402, and is thus included in the hash table 904 of the child document 202, which is bound to the document 402 by a parent-child relation.

Advantageously, embodiments of the present invention allow for specialization of content management tasks. Indeed, only a small number of experts may be required to maintain the hierarchy. In turn, this hierarchy of documents may be configured and used by a larger number of comparatively lower skilled persons that may be trained in setup and configuration only. Another advantage of embodiments of the present invention is that the parent-child relationship may span physical, corporate, organizational and/or network boundaries so that a parent document may be maintained in a remote location and many child documents may be located and managed in an environment local to the end user system. This is illustrated in FIG. 6, in which the child documents 612 and 614 are located away from their parent document 610 and are accessed across a network 616. This enables a scalable hierarchy of readily configurable documents. For example, a first party in a first location may maintain a master parent template document, such as parent document 102 or 402, for example. The master parent template document 102, 402 may be linked via a parent-child relation to multiple child template documents at remote locations. Multiple second parties in respective separate locations may use the child template documents that inherit from the master parent template document. A further third party may then create final end-user documents that include content elements and/or links that were inherited from the child templates of two or more separate second parties, in the manner described above relative to FIGS. 1-7. These third party end-user documents will have the benefit of being bound to their parent document by a common system and of having comparable structure, because all originated from the same related master parent template.

The above benefit supports a business model in which multiple second parties are enabled to build document templates that a third party can inherit from with confidence all documents will be compatible because they are descendent from the same root document. Further, the second parties may maintain the templates so that the third party receives the benefit of updated content, while maintaining local changes, and without the burden of making all changes.

A further advantage of embodiments of the present invention is achieved by a system that supports management of traditional content elements with executable code document elements within a single document. Indeed, by including both text based content elements with interactive programmatic content elements in a single document, content elements may be readily configured to meet the needs of multiple customers in a service environment. Such synergies are realized when documents are accessed via a common hierarchical system able to interpret coded elements and merge results with textual or image-based content elements, thereby achieving a dynamic information display along site-managed content.

Embodiments of the present invention find utility in the management of source code for computing applications, particularly when a common code base is customized for the needs of specific audiences. Indeed, according to further embodiments of the present invention, the content elements of the electronic documents of the hierarchy of electronic documents may include computer source code. The use of a multi-tiered parent-child relationship at the source code level, allows customization to be applied in a lower tier (tier=electronic documents at a same hierarchical level) while still supporting management of the core code maintained at a higher tier. In particular, embodiments of the present invention may readily applied in the management of libraries of interpreted business rules that are tailored and customized to configure an enterprise application to particular uses and environments. In object-oriented software development, the inheritance functionality disclosed herein may be applied to reduce the level of effort needed to build and maintain software applications. A first object class may be created, such that a second class can inherit from it in the manner described above, and expand the properties and behaviors. Future changes to the behavior of the first class may then be reflected in the second class, in the same manner that changes to a parent electronic document are reflected in child electronic documents bound thereto in a parent-child relation, as described herein.

Figure 10:
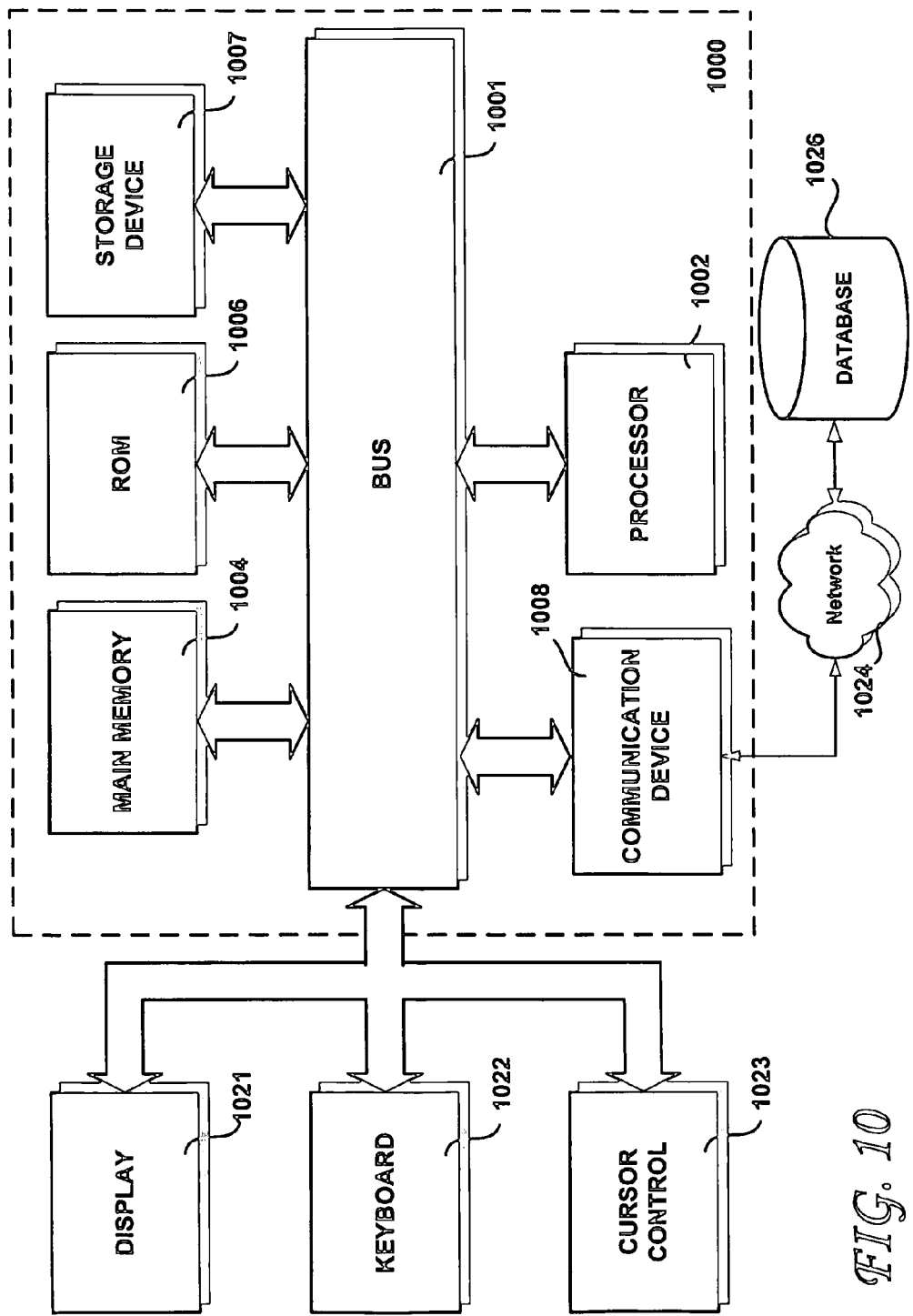
FIG. 10 is a block diagram of a computer with which embodiments of the present computer-implemented methods may be practiced.

FIG. 10 illustrates a block diagram of a computer system 1000 upon which embodiments of the present inventions may be implemented. Computer system 1000 includes a bus 1001 or other communication mechanism for communicating information, and one or more processors 1002 coupled with bus 1001 for processing information. Computer system 1000 further comprises a random access memory (RAM) or other dynamic storage device 1004 (referred to as main memory), coupled to bus 1001 for storing information and instructions to be executed by processor(s) 1002. Main memory 1004 also may be used for storing temporary variables or other intermediate information during execution of instructions by processor 1002. Computer system 1000 also includes a read only memory (ROM) and/or other static storage device 1006 coupled to bus 1001 for storing static information and instructions for processor 1002. A data storage device 1007, such as a magnetic disk or optical disk, may be coupled to bus 1001 for storing information and instructions. The computer system 1000 may also be coupled via the bus 1001 to a display device 1021 for displaying information to a computer user. An alphanumeric input device 1022, including alphanumeric and other keys, may be coupled to bus 1001 for communicating information and command selections to processor(s) 1002. Another type of user input device is cursor control 1023, such as a mouse, a trackball, or cursor direction keys for communicating direction information and command selections to processor 1002 and for controlling cursor movement on display 1021. The computer system 1000 may be coupled, via a communication device 1008 coupled to network 1024, to a database 1026 configured to store the electronic documents and their respective hash tables, among other information.

Embodiments of the present invention are related to the use of computer system and/or to a plurality of such computer systems to enable methods and systems for managing electronic documents. According to one embodiment, the methods and systems described herein may be provided by one or more computer systems 1000 in response to processor(s) 1002 executing sequences of instructions contained in memory 1004. Such instructions may be read into memory 1004 from another computer-readable medium, such as data storage device 1007. Execution of the sequences of instructions contained in memory 1004 causes processor(s) 1002 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computer system may implement the functionality described herein. The computer system may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of managing electronic documents comprising the steps of:
    providing a first electronic document, the first document including a plurality of first document content elements;
    providing a second electronic document, the second document including a plurality of second document content elements;
    defining a parent-child relation between the first document and the second document to form a hierarchy of electronic documents that includes the first and second electronic documents;
    defining and enforcing an override relation that binds together a selected first document content element and a selected second document content element and,
    revising the first electronic document, wherein the revising of the first electronic document carries out a corresponding revision to the second electronic document, the revising step including steps of:
    applying any updates to document content elements that are common to the first and second electronic documents, subject to the defined override relation;
    determining which of the first document content elements are not present in the second document content elements, and
    adding any first document content element that is not present in the second electronic to the second electronic document.

2. The method of claim 1, wherein the defining step is carried out with the override relation specifying an override type that determines whether the selected second document content element should be removed, replaced by or appended to the selected first document content element.

3. The method of claim 1, wherein at least one of the plurality of first and second content elements includes or points to at least one of text, an image, HTML content, video content, a Uniform Resource Locator (URL) and computer code.

4. The method of claim 1, wherein each content element of the plurality of first and second content elements is associated with a unique content element ID and a signature ID, and the selected second document content element, after the enforcing step is carried out, shares a same signature ID as the selected first document content element to which it is bound by the defined override relation.

5. The method of claim 4, further including a step of building a first hash table associated with the first electronic document and a second hash table associated with the second electronic document, the first hash table includes an entry for each of the plurality of first document content elements, each entry being keyed to the signature ID of its respective first document content element, and the second hash table includes an entry for each of the plurality of second document content elements, each entry being keyed to the signature ID of its respective second document content element.

6. The method of claim 5, wherein the first hash table includes an entry for each of the plurality of first document content elements and an entry for each content element of all hierarchically-higher electronic documents that are bound to the first electronic document, if any, and the second hash table includes an entry for each of the plurality of second document content elements and all entries in the first hash table.

7. The method of claim 5, wherein the signature ID of the overridden selected second document content element is the same as the signature ID of the selected first document content element bound thereto by the defined override relation.

8. The method of claim 1, further comprising the step of replacing the selected second document content element with a dummy element that is not rendered when the defining step is carried out with the override type that specifies that the selected second document content element should be removed.

9. The method of claim 1, wherein the second electronic document is remote from the first electronic document and the defining and enforcing steps are carried out across a computer network.

10. A machine-readable medium having data stored thereon representing sequences of instructions which, when executed by a computing device, causes the computing device to manage electronic documents by performing the steps of:
   providing a first electronic document, the first document including a plurality of first document content elements;
   providing a second electronic document, the second document including a plurality of second document content elements;
   defining a parent-child relation between the first document and the second document to form a hierarchy of electronic documents that includes the first and second electronic documents;
   defining and enforcing an override relation that binds together a selected first document content element and a selected second document content element, and
   revising the first electronic document, wherein the revising of the first electronic document carries out a corresponding revision to the second electronic document, the revising step including steps of:
      applying any updates to document content elements that are common to the first and second electronic documents, subject to the defined override relation;
      determining which of the first document content elements are not present in the second document content elements, and
      adding any first document content element that is not present in the second electronic to the second electronic document, subject to the defined override relation.

11. A computer system for managing electronic documents, the computer system comprising:
   at least one processor;
   at least one data storage device coupled to the at least one processor;
   a plurality of processes spawned by said at least one processor, the processes including processing logic for:
   providing a first electronic document, the first document including a plurality of first document content elements;
   providing a second electronic document, the second document including a plurality of second document content elements;
   defining a parent-child relation between the first document and the second document to form a hierarchy of electronic documents that includes the first and second electronic documents;
   defining and enforcing an override relation that binds together a selected first document content element and a selected second document content element, and
   revising the first electronic document, wherein the revising of the first electronic document carries out a corresponding revision to the second electronic document, the revising step including steps of:
      applying any updates to document content elements that are common to the first and second electronic documents, subject to the defined override relation;
      determining which of the first document content elements are not present in the second document content elements, and
      adding any first document content element that is not present in the second electronic to the second electronic document, subject to the defined override relation.

12. A computer-implemented method of managing electronic documents, comprising the steps of:
   providing a first hash map that defines a first electronic document, the first hash map including an entry for each of a plurality of first document content elements of the first electronic document, each of the plurality of first content elements being associated with a signature ID and a unique content element ID;
   providing a second hash map that defines a second electronic document that is bound to the first electronic document by a parent-child relation, the second hash map including an entry for each of a plurality of second document content elements of the second electronic document and all entries of the first hash map, each of the second document content elements being associated with a signature ID, each entry in the first and second hash maps being keyed to the signature ID of the corresponding first or second document content element;
   defining an override relation that binds together a selected first document content element and a selected second document content element;
   generating the second electronic document by processing the entries in the second hash map and enforcing the defined override relation, and
   revising the first electronic document, the revising of the first electronic document carrying out corresponding revisions of the first hash map, the second hash map and the second electronic document, wherein the revising step includes steps of:
      applying any updates to document content elements that are common to the first and second electronic documents, subject to the defined override relation;
      determining which of the first document content elements are not present in the second document content elements, and
      adding an entry for any first document content element that is not present in the second electronic to the second hash map, subject to the defined override relation.

13. The method of claim 12, wherein the defining step is carried out with the override relation specifying an override type that determines whether the selected second document content element should be removed, replaced by or appended to the selected first document content element.

14. The method of claim 12, wherein at least one of the first document content elements and the second document content elements includes or points to at least one of text, an image, HTML content, video content, a Uniform Resource Locator (URL) and computer code.

15. The method of claim 12, wherein each content element of the plurality of first and second document content elements is associated with a unique content element ID and a signature ID, and the selected second document content element, after the enforcing step is carried out, shares a same signature ID as the selected first document content element to which it is bound by the defined override relation.

16. The method of claim 12, further comprising the step of replacing the selected second document content element with a dummy element that is not rendered when the defining step is carried out with the override type that specifies that the selected second document content element should be removed.

17. The method of claim 12, wherein the signature ID of the overridden selected second document content element is the same as the signature ID of the selected first document content element bound thereto by the defined override relation.

18. The method of claim 12, wherein the second electronic document is remote from the first electronic document and the defining, enforcing and generating steps are carried out across a computer network.

19. A machine-readable medium having data stored thereon representing sequences of instructions which, when executed by a computing device, causes the computing device to manage electronic documents by performing the steps of:
 providing a first hash map that defines a first electronic document, the first hash map including an entry for each of a plurality of first document content elements of the first electronic document, each of the plurality of first content elements being associated with a signature ID and a unique content element ID;
 providing a second hash map that defines a second electronic document that is bound to the first electronic document by a parent-child relation, the second hash map including an entry for each of a plurality of second document content elements of the second electronic document and all entries of the first hash map, each of the second document content elements being associated with a signature ID, each entry in the first and second hash maps being keyed to the signature ID of the corresponding first or second document content element;
 defining an override relation that binds together a selected first document content element and a selected second document content element;
 generating the second electronic document by processing the entries in the second hash map and enforcing the defined override relation, and
 revising the first electronic document, the revising of the first electronic document carrying out corresponding revisions of the first hash map, the second hash map and the second electronic document, wherein the revising step includes steps of:
  applying any updates to document content elements that are common to the first and second electronic documents, subject to the defined override relation;
  determining which of the first document content elements are not present in the second document content elements, and
  adding an entry for any first document content element that is not present in the second electronic to the second hash map, subject to the defined override relation.

20. A computer system for managing electronic documents, the computer system comprising:
 at least one processor;
 at least one data storage device coupled to the at least one processor;
 a plurality of processes spawned by said at least one processor, the processes including processing logic for:
 providing a first hash map that defines a first electronic document, the first hash map including an entry for each of a plurality of first document content elements of the first electronic document, each of the plurality of first content elements being associated with a signature ID and a unique content element ID;
 providing a second hash map that defines a second electronic document that is bound to the first electronic document by a parent-child relation, the second hash map including an entry for each of a plurality of second document content elements of the second electronic document and all entries of the first hash map, each of the second document content elements being associated with a signature ID, each entry in the first and second hash maps being keyed to the signature ID of the corresponding first or second document content element;
 defining an override relation that binds together a selected first document content element and a selected second document content element;
 generating the second electronic document by processing the entries in the second hash map and enforcing the defined override relation, and
 revising the first electronic document, the revising of the first electronic document carrying out corresponding revisions of the first hash map, the second hash map and the second electronic document, wherein the revising step includes steps of:
  applying any updates to document content elements that are common to the first and second electronic documents, subject to the defined override relation;
  determining which of the first document content elements are not present in the second document content elements, and
  adding an entry for any first document content element that is not present in the second electronic to the second hash map, subject to the defined override relation.

* * * * *